United States Patent

[11] 3,569,986

[72] Inventors Josef Thoma
Waldkirch;
Walter Laeufer, Freiburg im Breisgau;
Benno Streu, Freiburg im Breisgau,
Germany

[21] Appl. No. 796,400
[22] Filed Feb. 4, 1969
[45] Patented Mar. 9, 1971
[73] Assignee Fritz Hellige & Co., G.m.b.H.
Freiburg, Breisgau, Germany
[32] Priority Feb. 13, 1968
[33] Germany
[31] 1,673,957.4

[54] STYLUS FOR RECORDING APPARATUS
7 Claims, 3 Drawing Figs.

[52] U.S. Cl. .......... 346/139
[51] Int. Cl. .......... G01d 15/00
[50] Field of Search .......... 346/139, 76

[56] References Cited

UNITED STATES PATENTS

| | | | |
|---|---|---|---|
| 2,777,747 | 1/1957 | Gilson et al. .......... | 346/76X |
| 3,187,332 | 6/1965 | Barter et al. .......... | 346/139 |
| 3,346,871 | 10/1967 | Fowler .......... | 346/139 |

*Primary Examiner*—Joseph W. Hartary
*Attorneys*—Franklin D. Jankosky, Alfred B. Levine, Richard Zentner and Alan C. Rose ABSTRACT: An apparatus for recording information wherein the stylus and the connecting means for a stylus and its driving means rotate on an axis perpendicular to the axis of the driving means. The connecting means include a symmetrical lever arrangement which ensures a constant trace producing pressure upon its reversal around the axis of the driving means. Such reversing capability permits the recording of information in more than one direction around the axis of rotation of the stylus. The connecting means facilitate rapid interchange of styli.

INVENTOR.
JOSEF THOMA
WALTER LÄEUFER
BENNO STREU
BY Franklin D. Jankosky
ATTORNEY

STYLUS FOR RECORDING APPARATUS

FIELD OF INVENTION

This invention relates to styli for recording apparatus and more particularly to novel means for facilitating the interchanging of such styli and for ensuring utilization of more than one writing surface of such styli.

DESCRIPTION OF THE PRIOR ART

Various types of styli for recording apparatus are well known. However, the prior art does not include a stylus for recording apparatus that may be rapidly interchanged by a simple step, involving no adjustment, and which may still be utilized after the reversal of the connecting elements between the stylus and the galvanometer, or pen-motor.

Accordingly, it is an object of the present invention to provide novel connecting means for facilitating the rapid interchanging of styli for recording apparatus.

It is a further object of the present invention to provide novel connecting means for ensuring that the writing pressure remains the same after the insertion of a new stylus.

It is a still further object of the present invention to provide novel connecting means that may be reversed so as to ensure utilization of more than one writing surface of a stylus.

It is still another object of the present invention to provide novel connecting means that allows recording of information in more than one direction around the axis of rotation of a stylus.

SUMMARY OF THE INVENTION

In accordance with the objects set forth above, the present invention provides novel connecting means for recording apparatus that facilitates the rapid interchanging of a stylus of such recording apparatus. The connecting means includes a symmetrical lever arrangement which ensures a constant trace producing pressure upon the insertion of a new stylus, and further permits a reversal of the connecting means so as to allow the recording of information in more than one direction around the axis of rotation of the stylus. The lever-whip of the connecting means and the stylus rotate on an axis perpendicular to the axis of the driving means of the stylus.

BRIEF DESCRIPTION OF THE DRAWINGS

Additional objects, advantages and characteristic features of the present invention will become readily apparent from the following detailed description of preferred embodiments of the invention when taken in conjunction with the accompanying drawings, in which.

DESCRIPTION OF THE PREFERRED EMBODIMENTS

Figures 1, 2, 3:
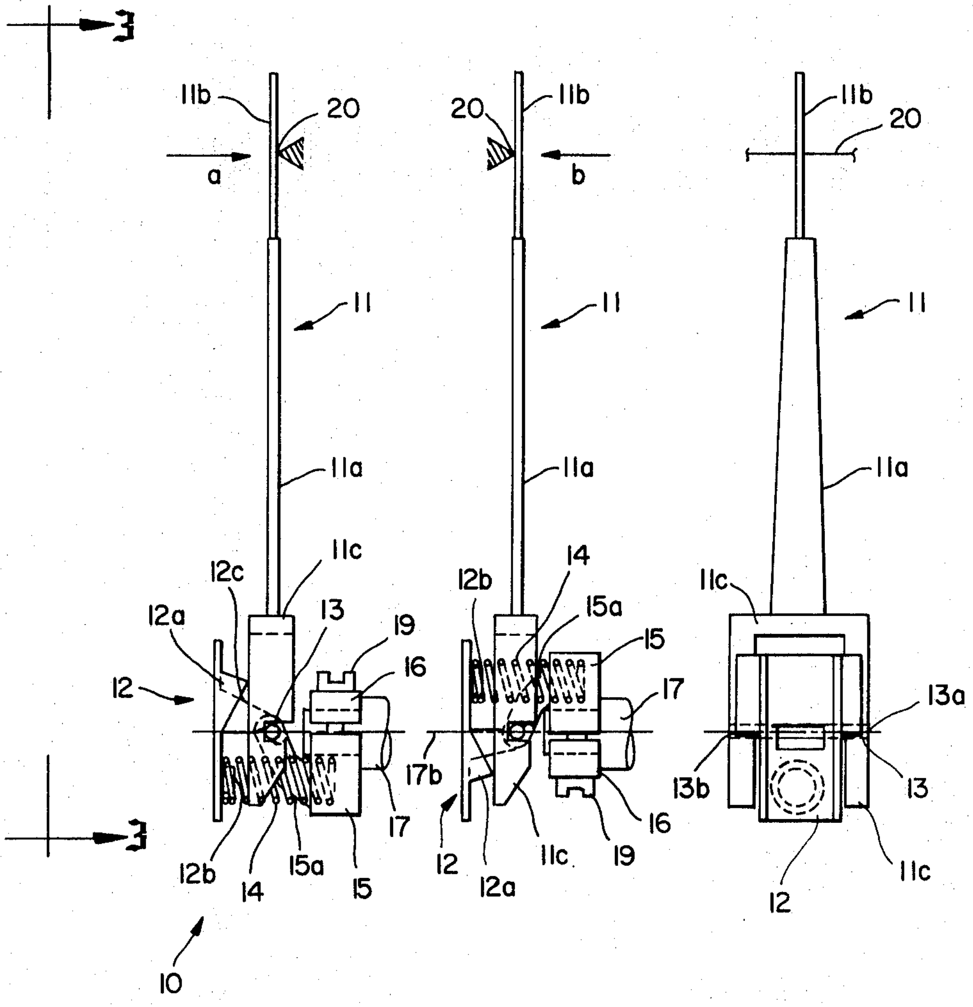
FIG. 1 is a side view of a recording device in accordance with the present invention.
FIG. 2 is a side view of a recording device in accordance with the present invention, wherein portions of the device are rotated 180°.
FIG. 3 is a side view of the recording device disclosed in FIG. 1 taken along lines 3–3 in accordance with the present invention.

Referring now to FIG. 1, there is shown a recording device 10 in accordance with the principles of the present invention. The recording device 10 includes ring flanges 15 and 16 which may be mounted to a shaft 17 having an axis 17*b*. The shaft 17 may be part of driving means, e.g., a galvanometer, not shown. The recording device 10 may be mounted on the shaft 17 by screws 19 which connect the ring flanges 15 and 16. The ring flange 15 has two projections 15*a* in which a slender shaft 13 is maintained by pins 13*a* and 13*b*, as shown in FIG. 3.

The shaft 13 forms a pivoting point for a lever-whip 12. As shown in FIG. 1, the lower arm of lever-whip 12 includes a cylindrical projection 12*b* which ensures the retention of one end of a compression spring 14 and a hook portion 12*c* for pivoting around the shaft 13. The other end of the compression spring 14 is retained within a cylindrical opening of the flange 15. The upper arm of the lever-whip 12 has T-shaped and wedge-shaped projections 12*a* which, respectively, maintain and retain pressure on a stylus 11. The stylus 11 is comprised of a writing portion 11*b*, an extension portion 11*a*, and a pivoting portion 11*c*. The pivoting portion 11*c* allows the stylus 11 to pivot around the shaft 13 in accordance with the bias provided by the arrangement of the compression spring 14 and the lever-whip 12. Extending from the pivoting portion 11*c* is the extension portion 11*a* which retains the writing portion 11*b*, which may be an electrically heated resistance. Thus, the writing portion 11*b* is biased in the direction of the arrow *a* against a writing edge 20.

Preferably, the compression spring 14 and the stylus 11 cooperate in a symmetrical manner with the lever-whip 12, i.e., there is an equal length of lever. Therefore, as shown in FIG. 2, the connecting means, comprising the lever-whip 12, the compression spring 14, and flanges 15 and 16, may be rotated 180°. The stylus 11 may then be inserted, as shown, so as to allow the writing portion 11*b* to be biased in the direction of arrow *b* against the writing part 20. Thus, in spite of the 180°shift, due to the symmetry of the lever arrangement, the trace producing pressure will remain the same.

Referring now to FIG. 3, there is shown the recording device 10 of FIG. 1 taken along the lines 3–3. FIG. 3 illustrates the T-shaped form of the lever-whip 12 which retains the stylus 11 so as to allow rotation of the lever-whip 12 and the stylus 11 around the axis of shaft 13. Thus, the arrangement fulfills some basic practical demands, namely, a constant writing pressure is maintained on the writing edge, independent of the position of the stylus 11, and the stylus 11 may be interchanged without any further adjustment by merely compressing the spring 14 and removing the stylus 11 from the shaft 13. Thus, no special tools are necessary in the operation of substituting a new stylus for a defective one.

From the technical standpoint, the compression spring 14 shall have an initial stress owing to its anchoring in the relatively deep cylindrical opening in the flange 15. Thus, the writing pressure at the writing edge 20 will be practically independent of the deflection movement of the stylus 11. The aforementioned qualities ensure valuable advantages in the use of fast writing recording apparatus, especially in use of such equipment in the medical diagnostic field.

Thus, although the present invention has been shown and described with reference to particular embodiments, for example, connecting means reversed 180°around a shaft, nevertheless, various changes and modifications obvious to a person skilled in the art to which the invention pertains, for example, rotation of connecting means to various positions, are deemed to lie within the spirit, scope, and contemplation of the invention, as set forth in the appended claims.

We claim:

1. A recording device adapted to be connected to driving means of a recording apparatus, comprising:
   - a stylus having at least one opening in proximity of the end opposite the writing end;
   - pivot means for respectively receiving said respective openings of said stylus and for facilitating rotation of said stylus, said pivot means rotatably mounted to said driving means; biasing means for biasing said stylus, said biasing means having a first end and a second end, said first end being in contact with said pivot means; and lever-whip means rotatably mounted to said pivot means for ensuring biasing of said stylus in at least one direction around said pivot means, said lever-whip means having a first end and a second end, said first end of said lever-whip means being in contact with said second end of said biasing means and said second end of said lever-whip means being in contact with said stylus.

2. A recording device as recited in claim 1, wherein said lever-whip means may be selectively positioned to apply bias to either a first or second position on said stylus so as to provide bias to allow said stylus to rotate in either direction around the axis of said pivot means.

3. A recording device as recited in claim 1, wherein said stylus is U-shaped in said end opposite said writing end to facilitate selective insertion of said stylus around said pivot means so that bias may be applied to either side of said stylus adjacent said writing end or the end opposite said writing end.

4. A recording device as recited in claim 1, wherein the axis of said pivot means is perpendicular to said axis of said driving means and said stylus may be selectively inserted into said lever-whip means so as to be biased in either direction perpendicular to said axis of said driving means.

5. A recording device adapted to be connected to driving means of a recording apparatus, comprising:

a stylus having at least one opening in proximity of the end opposite the writing end; and connecting means for connecting said stylus to said driving means of said recording apparatus, said connecting means comprising shaft retaining means for following the movements of driving means, a pivotal axis perpendicular to the axis of the shaft of said driving means rotatably mounted on said shaft retaining means, said pivotal axis adapted to receive said respective openings of said stylus, lever-whip means rotatably mounted to said pivotal axis for applying pressure to said stylus, and bias means maintained between said retaining means and said lever-whip means for biasing said stylus.

6. A recording device as recited in claim 5, wherein said retaining means and said lever-whip means have a cylindrical opening and a cylindrical projection, respectively, to retain said bias means.

7. A recording device as recited in claim 6, wherein said lever-whip means is symmetrically mounted rotatably on said pivotal axis so that the stylus may be selectively inserted into said connecting means so as to be biased in either of two directions.